(12) United States Patent
Horvarth et al.

(10) Patent No.: US 11,038,441 B2
(45) Date of Patent: Jun. 15, 2021

(54) PIEZO MOTOR DRIVEN DEVICE

(71) Applicant: STRATEC Biomedical AG, Birkenfeld (DE)

(72) Inventors: Tibor Horvarth, Straubenhardt (DE); Jens Großmann, Höfen a.d. Enz (DE)

(73) Assignee: STRATEC Biomedical AG, Birkenfeld (DE)

( * ) Notice: Subject to any disclaimer, the term of this patent is extended or adjusted under 35 U.S.C. 154(b) by 466 days.

(21) Appl. No.: 15/913,070

(22) Filed: Mar. 6, 2018

(65) Prior Publication Data

US 2018/0262128 A1 Sep. 13, 2018

(51) Int. Cl.
*H02N 2/04* (2006.01)
*H02N 2/02* (2006.01)
*H02N 2/06* (2006.01)
*B06B 1/06* (2006.01)

(52) U.S. Cl.
CPC ............ *H02N 2/043* (2013.01); *B06B 1/0603* (2013.01); *H02N 2/021* (2013.01); *H02N 2/06* (2013.01)

(58) Field of Classification Search
CPC .......... H02N 2/021; H02N 2/043; H02N 2/06; B06B 1/0603
See application file for complete search history.

(56) References Cited

U.S. PATENT DOCUMENTS

| | | | | |
|---|---|---|---|---|
| 5,049,775 A * | 9/1991 | Smits | ................ | H01L 41/0946 310/328 |
| 6,404,105 B1 * | 6/2002 | Norbert | ................ | H02N 2/021 310/323.17 |
| 6,429,572 B1 * | 8/2002 | Beyrard | ................ | H02N 2/002 310/328 |
| 8,189,431 B2 * | 5/2012 | Kitahara | ................ | G04C 3/12 368/220 |
| 2005/0005722 A1 | 1/2005 | Nishimoto et al. | | |
| 2012/0225748 A1 * | 9/2012 | Michel | ................ | F16H 1/2818 475/331 |

FOREIGN PATENT DOCUMENTS

JP 2008172967 A 7/2008

OTHER PUBLICATIONS

M. Plooij, G. Mathijssen, P. Cherelle, D. Lefeber and B. Vanderborght, "Lock Your Robot: A Review of Locking Devices in Robotics," in IEEE Robotics & Automation Magazine, vol. 22, No. 1, pp. 106-117, Mar. 2015. (Year: 2015).*
D. V. Dao, P. H. Pham, S. Amaya and S. Sugiyama, "Micro Ratcheting Transmission Systems Based on Electrostatic Actuator," 2008 International Symposium on Micro-NanoMechatronics and Human Science, Nagoya, 2008, pp. 17-20. (Year: 2008).*

(Continued)

*Primary Examiner* — Emily P Pham
(74) *Attorney, Agent, or Firm* — 24IP Law Group USA, PLLC; Timothy Dewitt

(57) ABSTRACT

A piezoelectric motor with form-locked drive mechanism avoiding step losses and undefined step sizes caused by environmental conditions such as temperature, surface quality and air humidity by engaging actuator teeth interacting with the toothed structure of a driven rack.

9 Claims, 2 Drawing Sheets

(56) References Cited

OTHER PUBLICATIONS

R. Legtenberg, E. Berenschot, M. Elwenspoek and J. H. Fluitman, "A fabrication process for electrostatic microactuators with integrated gear linkages," in Journal of Microelectromechanical Systems, vol. 6, No. 3, pp. 234-241, Sep. 1997. (Year: 1997).*
R. Legtenberg, E. Berenschot, M. Elwenspoek and J. Fluitman, "Electrostatic microactuators with integrated gear linkages for mechanical power transmission," Proceedings of Ninth International Workshop on Micro Electromechanical Systems, San Diego, CA, USA, 1996, pp. 204-209. (Year: 1996).*

* cited by examiner

PIEZO MOTOR DRIVEN DEVICE

CROSS-REFERENCE TO RELATED APPLICATIONS

The present application claims priority to British Patent Application No. GB 1703593.2 filed on Mar. 7, 2017. The aforementioned application is hereby incorporated by reference in its entirety.

BACKGROUND OF THE INVENTION

Field of the Invention

The field of the invention relates to a piezo motor driven device.

Brief Description of the Related Art

In life sciences, the medical sector and clinical diagnostics, there is a need for small and accurate drives for high precision positioning applications in automatic analyzer systems and manipulators. Piezo or piezoelectric motors are suitable for such purposes for example to drive an ultrasonic nozzle, for ultrafine focusing of optical assemblies, for scanning probe microscopies with atomic resolution, to point sensors at the right location, move samples, or for fluid dispensing on a small scale.

Piezo motors make use of the converse piezoelectric effect whereby the piezoelectric material produces acoustic or ultrasonic vibrations for producing a motion.

Several piezo motor principles are known. One drive technique is to use piezo material to push a stator. These piezo motors are basically stepping motors, with each step comprising either two or three actions, based on the locking type.

Another piezo drive technique uses piezoelectric elements that are bonded orthogonally to a nut and their ultrasonic vibrations rotate and translate a central lead screw. This is called a piezo direct drive motor.

The direct drive piezo motor uses continuous ultrasonic vibrations to provide movement. A two-channel sinusoidal or square wave is applied to the piezoelectric elements at an ultrasonic frequency of about 40 kHz to 200 kHz, matching the first bending resonant frequency of the threaded tube. This creates orbital motion which drives the screw.

The non-powered behavior of a piezo motor is one of two options: normally locked or normally free. When no power is being applied to a normally locked motor, the spindle or carriage for rotary or linear types respectively, will not move under external force. For normally free motor, the spindle or carriage will move freely under external force. However, if both locking groups are powered at rest, a normally free motor will resist external force without providing any motive force. A combination of mechanical latches and crystals could be used, but this would restrict the maximum stepping rate of the motor.

U.S. Patent Application Publication No. 2005/0005722 A1 discloses an example of a piezoelectric motor drive having a longitudinal gear rack. This application refers to a positioning device that includes a movable body; a position detection unit detecting a position of the movable body; a first and a second vibratory actuator controlled in accordance with a detection output from the position detection unit; a first transmission mechanism comprising a first gear wheel and a first rack engaging the first gear wheel, the first transmission mechanism transmitting a driving force of the first vibratory actuator to the movable body; and a second transmission mechanism comprising a second gear wheel and a second rack engaging the second gear wheel, the second transmission mechanism transmitting a driving force of the second vibratory actuator to the movable body. An engaging position of the first gear wheel with the first rack is different from an engaging position of the second gear wheel with the second rack.

Japanese Patent Application Publication No. 2008172967 A discloses another example of a piezoelectric motor drive having a longitudinal gear rack. This application discloses a guide part that includes guide faces, which extend along the moving direction so as to receive a driving force when an operation part generates a driving force, and a bottom part that extends along the moving direction so as to support the operation part while being in contact therewith regardless of a driving force generated by the operation part. The operation part according to this document has tooth parts in contact with the guide faces. The operation part includes a pair of moving elements, which respectively has a ratchet mechanism that slides in one of the extending directions of the guide faces and engages in the other of the extending directions, an ultrasonic actuator for generating a driving force, and a driving force transmission mechanism that is driven by the ultrasonic actuator so as to expand/reduce an interval between the pair of moving elements in the extending direction.

The prior art piezoelectric motor principles are all based on motion by sliding or static friction between a stationary part, the stator and a moved part, the rotor.

The disadvantage of the prior art piezo motors with a frictionally engaged drive mechanism is, that every single step or movement of an actuator as well as the self-locking of the motor are strongly influenced by environmental conditions and physical factors such as temperature, surface quality, pretension force, air humidity and others. The prior art motors compensate for the effect of such factors with a sufficient or over dimensioned pretension force and are driven in a closed loop drive control. The operation of the prior art motors is thus very complex and expensive.

The above-mentioned effects need to be compensated with pretension force and the motor is to be driven in a closed loop drive control. Especially, when a piezoelectric motor is needed for positioning purposes along a given ramp, as it is the case when a pump in a pipetting device is driven, such measures should be taken.

Thus, there is a need for a piezoelectric motor that avoids step losses or undefined step sizes caused by environmental conditions like e.g. temperature, surface quality, air humidity, but can be permanently locked or unlocked in an unpowered state.

SUMMARY OF THE INVENTION

It is an object of the invention to provide a piezo motor driven device that avoids step losses, undefined step sizes caused by environmental conditions like e.g. temperature, surface quality, air humidity and can be permanently locked or unlocked in an unpowered state.

The instant invention provides a piezo motor driven device comprising a movable gear rack with a toothed structure on its longitudinal opposite sides and at least three actuators each having a tooth, wherein the at least three actuators are arranged in a manner that at least one actuator is present on each longitudinal sides of the gear rack and each actuator is connected with an end of a piezo bender.

In a further aspect of the invention, each tooth of the at least three actuators may have a size to engage into the toothed structure of the gear rack.

It is intended that a tooth of the gear rack has a wide X and a tooth of an actuator is staggered in a distance X/n within a clearance between two teeth of the gear rack, wherein n is an integer starting with 3 representing the number of actuators, so that each tooth of an actuator is located at a different position within the clearance between two teeth of the gear rack.

Each of the at least three actuators may comprise a central part.

The central part of a piezo motor driven device may provide in a further aspect for each of the at least three actuators being enclosed by an actuator arm having the tooth for engaging into the gear rack on one end and a spring-load mechanism located on the other end.

The movable guide rack can be embedded into a guide rail and the gear rack may further be symmetrically toothed.

Another aspect of the invention refers to a method for moving a gear rack with a piezo motor comprising the gear rack with a toothed structure on its longitudinal opposite sides and at least four actuators each having a tooth, wherein the at least four actuators are arranged on both longitudinal sides of the gear rack and each actuator is connected to an end of a piezo bender, comprising the steps of actuating the piezo bender sequentially,
 engaging the teeth of the at least four actuator sequentially and vertically into the toothed structure of the gear rack,
 moving the gear rack in a direction depending on the sequence of actuating the at least four actuator.

The gear rack may be moved linear by the above described method.

Still other aspects, features, and advantages of the present invention are readily apparent from the following detailed description, simply by illustrating a preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description, or may be learned by practice of the invention

BRIEF DESCRIPTION OF THE FIGURES

For a more complete understanding of the present invention and the advantages thereof, reference is now made to the following description and the accompanying drawings, in which.

DETAILED DESCRIPTION OF THE INVENTION

The invention provides a piezo bender arranged within a form-locked drive mechanism avoiding step losses and undefined step sizes caused by environmental conditions such as temperature, surface quality and air humidity.

A piezo bender generates a bending mode upon activation of a piezo element located at one end of the bending element of the piezo bender. Within the description of the instant invention, the terms piezo motor and piezo bender are used synonymously.

The invented piezo motor principle works with at least three single actuators which are integrated into a form-locked drive mechanism. The described technology avoids step losses, undefined step sizes caused by environmental conditions like e.g. temperature, surface quality, air humidity.

The invented motor can be configured to be permanently locked or to be permanently unlocked in an unpowered state. It is further possible to use the described piezo motor without an encoder, due to the form locked drive mechanism, even for positioning on a given time-speed ramp.

Figure 1:
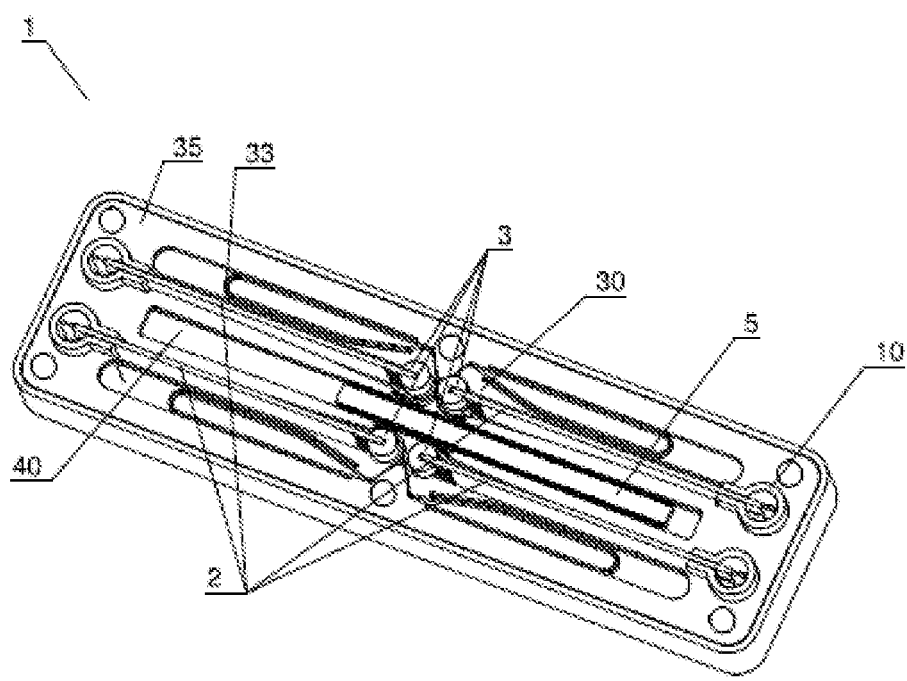
FIG. 1 Schematic depiction of a piezo motor driven device of the invention.

The advantages of the invention of the present disclosure can be summarized as follows:
- Reduced influence of environmental conditions
- Prevention of step losses
- Defined step sizes
- Increased accuracy
- No encoder is needed
- Possibility to configure the piezoelectric motor to be permanently locked or to be permanently unlocked in unpowered state FIG. 1 shows a device 1 with a gear rack 5 and four actuators. The actuators have a central element 3 that is surrounded by one end of an actuator arm 30. The actuator arm 30 has on one end a spring load mechanism 33 that is connected with frame 35 in device 1. The opposite end of the actuator arm 30 surrounds the central element 3 and has further a tooth 4 arranged near its end for engaging into gears of gear rack 5. Gear rack 5 is located within guide rail 40 for guiding movement of gear rack 5 only in two directions. One end of bending element 2 of the piezo bender engages into central element 3, the opposite end is fixed by fixation of bending element 10. Bending of the bending element 2 by activation of the piezo element results in a movement of the central element 3 and thus teeth 4 towards gear rack 5. Gear rack 5 is moved by a sequentially activation of the piezo bender causing sequential engagement of teeth 4 into the teeth of gear rack 5.

Figure 2:
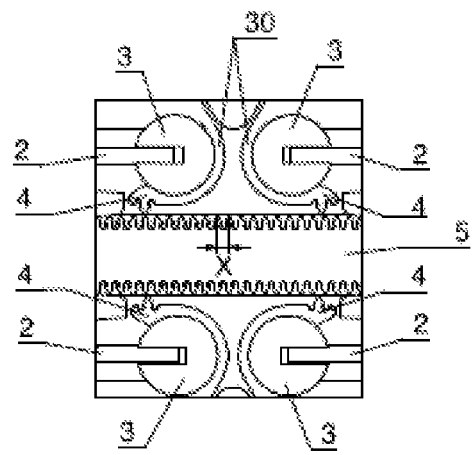
FIG. 2 Detailed depiction of design principle

FIG. 2 shows a detailed depiction of the arrangement of four teeth 4 of the actuators on both sides of gear rack 5. Each tooth 4 is located at the end of actuator arm 30. One end of bending element 2 engages into central element 3. Bending the bending element 2 will result in a movement of teeth 4 towards gear rack 5 and engagement into the teeth of gear rack 5. The teeth of the gear rack 5 have width X and the actuator tooth 4 are arranged in a distance corresponding to X/4 in case of four actuators. The teeth of the actuator are thus located in different positions within the clearance between two teeth of gear rack. This correlation between the width X of gear teeth and staggering actuator teeth 4 results in a movement of gear rack 5 depending on the sequence of arranging the actuator's teeth in the clearance between the teeth of the gear rack.

Figure 3:
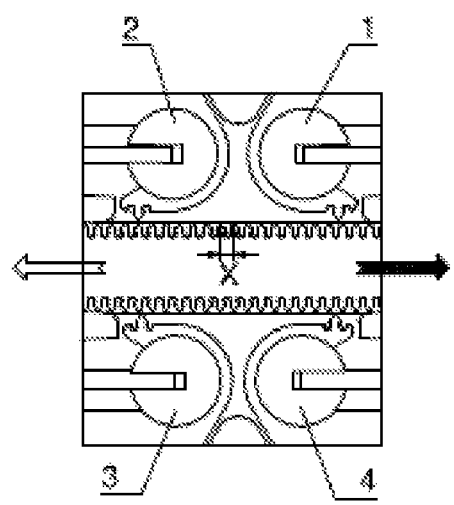
FIG. 3 Sequence of actuation and direction of movement

FIG. 3 shows how movement of gear rack 5 to the right or left can be achieved by sequentially actuating the teeth of the actuators. If the actuators will be energized sequentially (e.g. 1-2-3-4-1-2-3-4 . . . ) the rack will move X/4 stepwise to the right (black arrow). A mirroring of the sequence changes the movement direction of the rack (white arrow). Due to the principle, the drive resolution and precision of such a piezo motor having four actuators is X/4 mm.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein

REFERENCE NUMERALS 1 device
2 bending element
3 central element
4 actuator tooth
5 gear rack
X width of gear teeth
10 fixation bending element
30 actuator arm
33 spring load mechanism
35 frame
40 guide rail

What is claimed is:

1. A piezo motor driven device comprising a movable gear rack with a toothed structure on two opposite longitudinal sides and at least three actuators each having a tooth, wherein the at least three actuators are arranged in a manner that at least one actuator is present on each longitudinal side of the movable gear rack and each actuator is connected with an end of a piezo bender.

2. The piezo motor driven device of claim 1, wherein each tooth of the at least three actuators has a size to engage into the toothed structure of the movable gear rack.

3. The piezo motor driven device of claim 1, wherein a tooth of the movable gear rack has a size X and the tooth of said each actuator is staggered in a distance X/n within a clearance between two teeth of the movable gear rack, wherein n is an integer starting with 3 representing the number of actuators, so that each tooth of an actuator is located at a different position within the clearance between two teeth of the movable gear rack.

4. The piezo motor driven device of claim 1, wherein each of the at least three actuators comprises a central part.

5. The piezo motor driven device of claim 1, wherein the central part of each of the at least three actuators is enclosed by an actuator arm having the tooth for engaging into the movable gear rack on one end and a spring-load mechanism located on the other end.

6. The piezo motor driven device of claim 1, wherein the movable guide rack is embedded into a guide rail.

7. The piezo motor driven device of claim 1, wherein the movable gear rack is symmetrically toothed.

8. A method for moving a gear rack with a piezo motor comprising the gear rack with a toothed structure on two opposite longitudinal sides and at least three actuators each having a tooth, wherein the at least three actuators are arranged on both of the two opposite longitudinal sides of the gear rack and each actuator is connected to an end of a piezo bender, comprising steps of
  actuating the piezo bender sequentially,
  engaging the teeth of the at least three actuators sequentially and vertically into the toothed structure of the gear rack,
  moving the gear rack in a direction depending on the sequence of actuating the at least three actuators.

9. The method of claim 8, wherein the gear rack is moved linear.

* * * * *